(12) United States Patent
Giddings

(10) Patent No.: US 7,950,235 B1
(45) Date of Patent: May 31, 2011

(54) JET ENGINE

(76) Inventor: Donald Giddings, St. Thomas (VG)

( * ) Notice: Subject to any disclaimer, the term of this patent is extended or adjusted under 35 U.S.C. 154(b) by 886 days.

(21) Appl. No.: 11/925,052

(22) Filed: Oct. 26, 2007

(51) Int. Cl.
*F02K 7/08* (2006.01)
(52) U.S. Cl. ........................................ 60/767
(58) Field of Classification Search .............. 60/767, 60/768, 224, 225, 244; 137/15.1, 15.2
See application file for complete search history.

(56) References Cited

U.S. PATENT DOCUMENTS

| | | | | |
|---|---|---|---|---|
| 2,934,895 A | * | 5/1960 | Gregory et al. | 60/244 |
| 3,091,082 A | * | 5/1963 | Newcomb et al. | 60/244 |
| 3,172,253 A | * | 3/1965 | Hughes et al. | 60/263 |
| 4,500,052 A | * | 2/1985 | Kim | 244/12.1 |
| 4,667,900 A | * | 5/1987 | Kim | 244/53 B |
| 4,778,130 A | * | 10/1988 | Kim | 244/53 R |
| 4,934,632 A | * | 6/1990 | Kim | 244/53 R |

* cited by examiner

*Primary Examiner* — Michael Cuff
*Assistant Examiner* — Phutthiwat Wongwian

(57) ABSTRACT

A jet engine is constructed of a fanjet; a plurality of ramjets provided around said fanjet; a plurality of air flow spaces between said fanjet and said plurality of ramjets; and a cooling jacket provided around said plurality of ramjets.

4 Claims, 2 Drawing Sheets

JET ENGINE

FIELD

The present invention relates to jet engines. More particularly, the present invention relates to a jet engine which is capable of fuel-efficient subsonic and supersonic propulsion.

BACKGROUND

Jet aircraft utilize a variety of jet engines depending on the type of aircraft. Subsonic passenger jet aircraft are typically fitted with multiple fanjets, each of which includes a housing having a front intake, a rear nozzle and a central shaft rotatably mounted in the housing between the intake and nozzle. Multiple compressor fans are provided on the shaft inside the housing, and a combustion chamber is situated in the housing behind the compressor fans. In operation, air enters the fanjet through the intake of the housing. The compressor fans compress and expel the air into the combustion chamber. Jet fuel is injected into the combustion chamber and ignited with the compressed air, and the resultant expanding gases are violently ejected through the nozzle, propelling the aircraft forward.

Other types of aircraft, including military aircraft and other types of high-speed or supersonic aircraft, for example, commonly utilize ramjets, which have no compressor fans or other moving parts. Ramjets operate by utilizing compressed air that flows into the ramjet due to the aircraft moving forwardly at high speeds. Because fanjets utilize some of the burning fuel to rotate the compressor fans, ramjets are typically more fuel efficient at high speeds due to the lack of moving parts.

SUMMARY

The present invention is generally directed to a jet engine. An illustrative embodiment of the jet engine includes a fanjet and a plurality of ramjets provided around the fanjet.

BRIEF DESCRIPTION OF THE DRAWINGS

The invention will now be described, by way of example, with reference to the accompanying drawings, in which.

DETAILED DESCRIPTION

Figure 1:
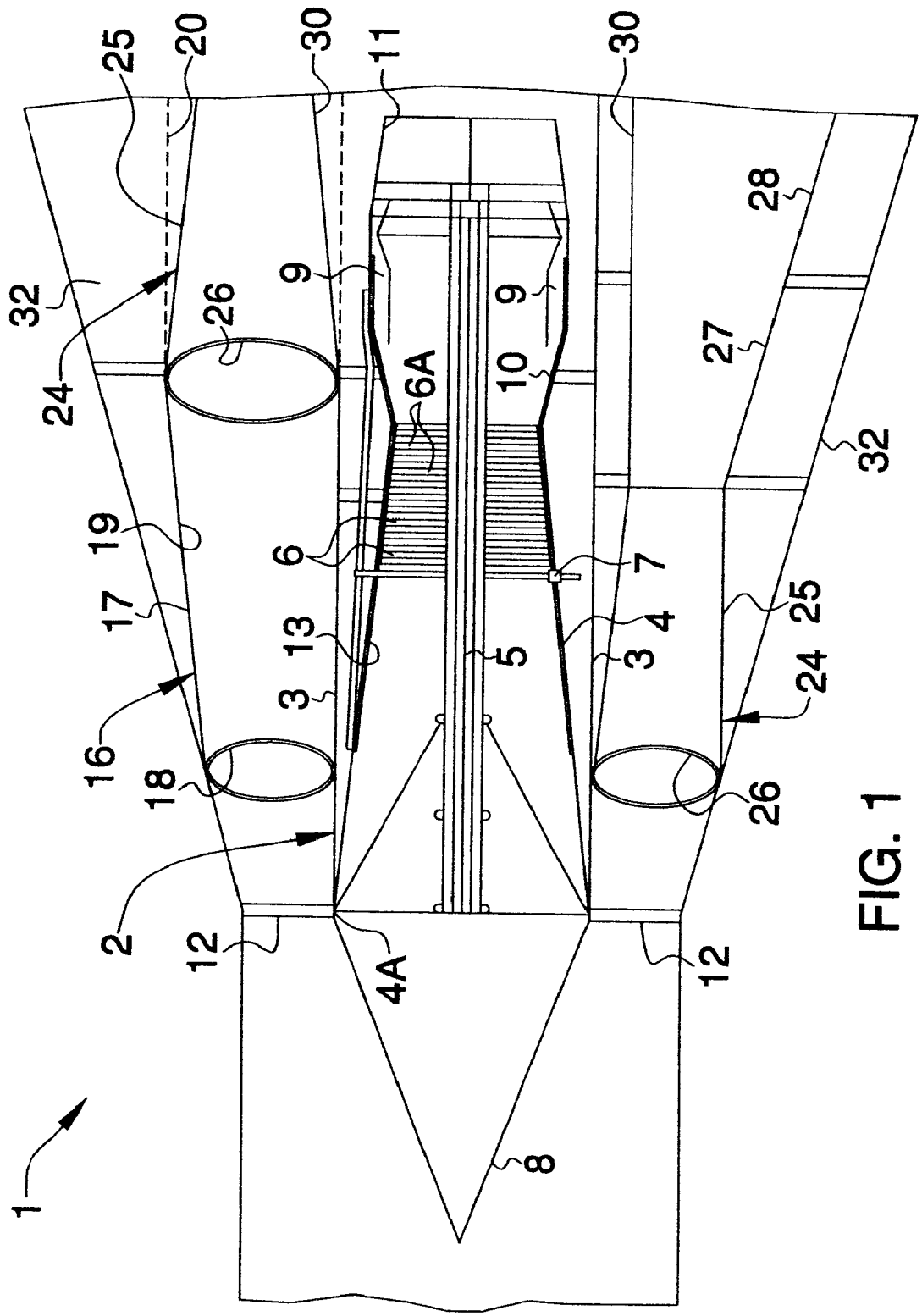
FIG. 1 is a longitudinal sectional view of an illustrative embodiment of a jet engine.

Referring to the drawings, an illustrative embodiment of a jet engine is generally indicated by reference numeral 1. The jet engine 1 is fuel efficient and suitable for use in a variety of applications, including but not limited to military aircraft and supersonic passenger aircraft.

As shown in FIG. 1, the jet engine 1 includes a central fanjet 2. The fanjet 2 may have a conventional design, typically including an elongated cowling 3. Multiple fanjet supports 12 may be provided to facilitate attachment of the fanjet 2 to a frame (not shown) of an aircraft (not shown). An elongated engine housing 4 is provided in the cowling 3. The engine housing 4 typically includes an intake 4a at the front end thereof. A cone 8 is mounted in the engine housing 4 and is movable between a forward or extended position shown in FIG. 1 in which the cone 8 engages the engine housing 4 and seals the intake 4a and a rear or retracted position (not shown) in which the cone 8 disengages the engine housing 4 and opens the intake 4a. The cone 8 may be adapted to move in the engine housing 4 using any suitable cone displacing mechanism (not shown). For example, the cone displacing mechanism may utilize pressurized oil to move the cone 8 between the extended and retracted positions.

A compressor chamber 13 is provided in the engine housing 4, behind the intake 4a. A central fan shaft 5 is rotatably mounted in the engine housing 4, typically in conventional fashion according to the knowledge of those skilled in the art, and extends through the compressor chamber 13. Multiple compressor fans 6 are mounted on the fan shaft 5 for rotation therewith inside the compressor chamber 13. Multiple stator fans 6a are also mounted in the compressor chamber 13, adjacent to the compressor fans 6. The stator fans 6a remain stationary with respect to the compressor fans 6 as the compressor fans 6 rotate with the fan shaft 5. A starting air valve 7 may be provided in the compression chamber 13 to control the volume of air flowing through the compressor fans 6.

A combustion chamber 10 is provided in the engine housing 4, behind the compressor chamber 13. Multiple fuel injection nozzles and igniter (not shown) are provided in the combustion chamber 10 to inject jet fuel (not shown) into the combustion chamber 10 and ignite the fuel. Multiple cooling surfaces 9 may be provided in the combustion chamber 10 to enhance cooling of the engine housing 4. A nozzle 11 is provided at the rear end of the engine housing 4, behind the combustion chamber 10.

Figure 2:
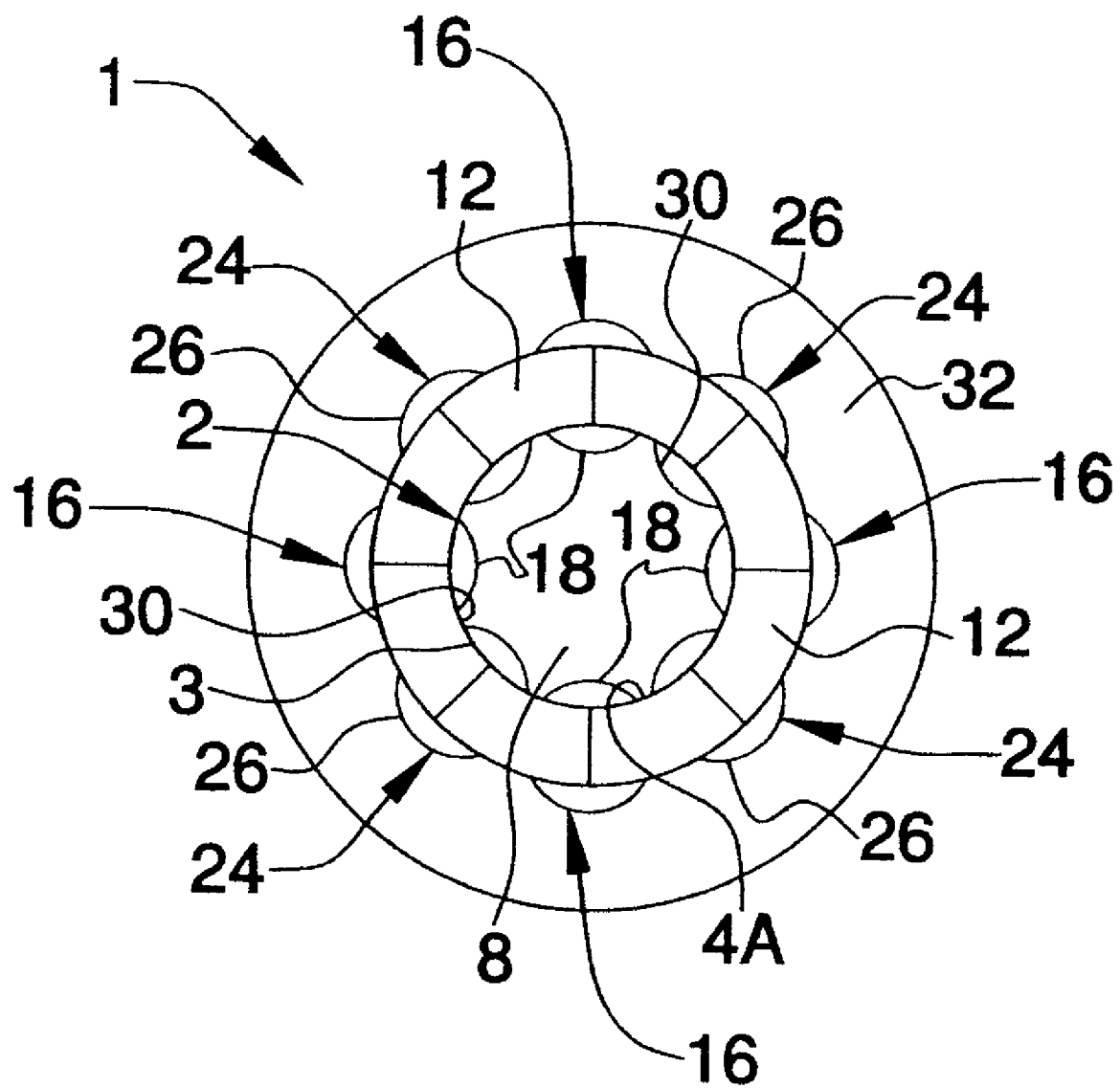
FIG. 2 is a front view of an illustrative embodiment of a jet engine.

As shown in FIG. 2, multiple subsonic ramjets 16 and supersonic ramjets 24 are provided in adjacent relationship to each other around the circumference of the fanjet 2. The subsonic ramjets 16 and supersonic ramjets 24 may be provided around the circumference of the fanjet 2, in alternating relationship to each other. In the embodiment shown in FIG. 2, four subsonic ramjets 16 and four supersonic ramjets 24 alternate with each other around the fanjet 2, although this number of subsonic ramjets 16 and supersonic ramjets 24 may vary. As used herein, the term "subsonic ramjet" means any ramjet which is capable of sustained operation at subsonic or both subsonic and supersonic speeds. As used herein, the term "supersonic ramjet" means any ramjet which is capable of sustained operation at supersonic speeds.

As shown in FIG. 1, each subsonic ramjet 16 may have a conventional ramjet design and typically includes an elongated subsonic ramjet housing 17. The subsonic ramjet housing 17 includes an intake 18, a combustion chamber 19 behind the intake 18 and a subsonic ramjet nozzle 20 behind the combustion chamber 19, at the rear end of the subsonic ramjet housing 17. The subsonic ramjet housing 17 includes the components (not shown), such as multiple fuel injection nozzles and igniter, necessary to render functionality to the subsonic ramjet 16.

As shown in FIG. 1, each supersonic ramjet 24 may have a conventional ramjet design and typically includes an elongated supersonic ramjet housing 25. The subsonic ramjet housing 25 includes an intake 26, a combustion chamber 27 behind the intake 26 and a subsonic ramjet nozzle 28 behind the combustion chamber 27, at the rear end of the subsonic ramjet housing 25. The supersonic ramjet housing 25 includes the components (not shown), such as fuel injection nozzle and igniter, necessary to render functionality to the supersonic ramjet 24.

As shown in FIGS. 1 and 2, a cooling jacket 32 may be attached to the subsonic ramjet housings 17 and supersonic ramjet housings 25. The cooling jacket 32 surrounds the subsonic ramjets 16 and supersonic ramjets 24 to direct flowing air adjacent to the subsonic ramjets 16 and supersonic ramjets 24 during operation of the jet engine 1, for cooling purposes. Air flow spaces 30 may be provided between the fanjet 2 and each subsonic ramjet 16 and supersonic ramjet 24 for cooling purposes.

Controls (not shown) for the fanjet 2, the subsonic ramjets 16 and the supersonic ramjets 24 are provided typically in the cockpit (not shown) in the aircraft (not shown) on which the jet engine 1 is mounted. The fuel supply, hydraulic supply, pressurization and electrical power for the jet engine 1 may be provided by an auxiliary power unit (not shown), typically in conventional fashion.

In typical application, one or multiple jet engines 1 is/are provided on a frame or body (not shown) of an aircraft (not shown). Each jet engine 1 is connected to the appropriate fuel, hydraulic and electrical power supplies (not shown) of the aircraft, according to the knowledge of those skilled in the art. In use of the jet engine 1, the fanjet 2 is initially operated to propel the aircraft forwardly at subsonic speeds. Accordingly, the cone 8 is moved to the extended or forward position (not shown) to open the intake 4a of the engine housing 4. The fan shaft 5 is rotated to rotate the compressor fans 6 relative to the stator fans 6a in the compression chamber 13 of the engine housing 4. Accordingly, air (not shown) is drawn into the engine housing 4 through the intake 4a, compressed by the compressor fans 6 and stator fans 6a in the compression chamber 13 and ejected into the combustion chamber 10, respectively. Jet fuel (not shown) is injected into the combustion chamber 10 through the fuel injection nozzles (not shown), mixed with the compressed air and ignited. The burning gases expand in the combustion chamber 10 and are violently ejected through the nozzle 11 to propel the jet engine 1 and aircraft (not shown) forwardly.

As the jet engine 1 moves forwardly under operation of the fanjet 2, air (not shown) enters the intake 18 of each subsonic ramjet 16. When the forward speed of the jet engine 1 is such that the pressure of the air flowing into the intake 18 of each subsonic ramjet 16 is sufficient to initiate and sustain operation of the subsonic ramjets 16, operation of the subsonic ramjets 16 is initiated. Simultaneously, operation of the fanjet 2 is terminated. The cone 8 may be retracted in the engine housing 4 to close the intake 4a of the fanjet 2. In operation of the subsonic ramjets 16, jet fuel (not shown) is injected into the combustion chamber 19 of each subsonic ramjet 16 through the fuel injection nozzles (not shown) and ignited. The burning gases expand in the combustion chamber 19 and are violently ejected from the nozzle 20 of each subsonic ramjet 16, propelling the jet engine 1 and aircraft forwardly at speeds which approach, reach and then surpass the speed of sound.

When the forward speed of the jet engine 1 is such that the pressure of the air flowing into the intake 26 of each supersonic ramjet 24 is sufficient to initiate and sustain operation of the supersonic ramjets 24, operation of the supersonic ramjets 24 is initiated. Simultaneously, operation of the subsonic ramjets 16 is terminated. In operation of the supersonic ramjets 24, jet fuel (not shown) is injected into the combustion chamber 27 of each supersonic ramjet 24 through the fuel injection nozzles (not shown) and ignited. The burning gases expand in the combustion chamber 27 and are violently ejected from the nozzle 28 of each supersonic ramjet 24, propelling the jet engine 1 and aircraft forwardly at speeds which surpass the speed of sound and reach the cruising altitude of the aircraft. Throughout operation of the fanjet 2, air flows through the air flow spaces 30, thereby cooling the fanjet 2. Throughout operation of the subsonic ramjets 16 and supersonic ramjets 24, air flows through the air flow spaces 30 and cooling jacket 32, thereby cooling the subsonic ramjets 16 and supersonic ramjets 24.

Shutting down of the jet engine 1 is accomplished by slowing the forward speed of the jet engine 1 to speeds which are sufficient to sustain operation of the subsonic ramjets 16, at which time the supersonic ramjets 24 are shut down. The forward speed of the jet engine 1 is further slowed to speeds which are sufficient to sustain operation of the fanjet 2, at which time the subsonic ramjets 16 are shut down. Finally, the fanjet 2 is shut down after landing of the aircraft.

While the preferred embodiments of the invention have been described above, it will be recognized and understood that various modifications can be made in the invention and the appended claims are intended to cover all such modifications which may fall within the spirit and scope of the invention.

What is claimed is:

1. A jet engine, comprising:
   a fanjet having an inlet and a movable cone coupled to the inlet;
   a plurality of ramjets provided around said fanjet;
   a plurality of air flow spaces between said fanjet and said plurality of ramjets;
   a cooling jacket provided around said plurality of ramjets;
   said plurality of ramjets comprises a plurality of subsonic ramjets and a plurality of supersonic ramjets;
   said plurality of subsonic ramjets and said plurality of supersonic ramjets are arranged in alternating relationship to each other;
   wherein the movable cone is opened for an airflow to enter the inlet during the fanjet operation and the movable cone is closed for the airflow to enter the inlet during the plurality of subsonic and supersonic ramjets operations.

2. The jet engine of claim 1 wherein said fanjet further comprises a cowling, an engine housing having the inlet provided in said cowling and the movable cone provided in said engine housing.

3. The jet engine of claim 2 further comprising a compression chamber provided in said engine housing adjacent to said cone and a plurality of compressor fans rotatably mounted in said compression chamber.

4. The jet engine of claim 3 further comprising a combustion chamber provided in said engine housing adjacent to said compression chamber and a nozzle provided in said engine housing adjacent to said combustion chamber.

* * * * *